United States Patent [19]

Nakazawa et al.

[11] Patent Number: 4,719,757
[45] Date of Patent: Jan. 19, 1988

[54] VARIABLE-VOLUME TURBOCHARGER

[75] Inventors: Norio Nakazawa; Yoshimasa Matsura; Tetsuo Takemoto; Susumu Kohketsu, all of Tokyo, Japan

[73] Assignee: Mitsubishi Jidosha Kogya Kabushiki Kaisha, Japan

[21] Appl. No.: 801,698

[22] PCT Filed: Mar. 15, 1985

[86] PCT No.: PCT/JP85/00129

§ 371 Date: Nov. 12, 1985

§ 102(e) Date: Nov. 12, 1985

[30] Foreign Application Priority Data

| Mar. 15, 1984 | [JP] | Japan | 59-37187[U] |
| Mar. 15, 1984 | [JP] | Japan | 59-37192[U] |
| Jul. 31, 1984 | [JP] | Japan | 59-117813[U] |
| Jul. 31, 1984 | [JP] | Japan | 58-117815[U] |
| Jul. 31, 1984 | [JP] | Japan | 59-117816[U] |
| Jul. 31, 1984 | [JP] | Japan | 59-161158 |
| Nov. 15, 1984 | [JP] | Japan | 59-173540[U] |
| Mar. 13, 1985 | [JP] | Japan | 60-48194 |
| Mar. 13, 1985 | [JP] | Japan | 60-34624[U] |

[51] Int. Cl.⁴ .............................. F02B 37/12
[52] U.S. Cl. ...................... 60/602; 415/155; 29/156.8 R
[58] Field of Search ............ 60/600, 601, 602, 603; 415/148, 155

[56] References Cited

U.S. PATENT DOCUMENTS

| 4,098,085 | 7/1978 | McDowell | 60/602 |
| 4,165,763 | 8/1979 | Hough | 60/602 X |
| 4,526,004 | 7/1985 | French et al. | 60/602 |

FOREIGN PATENT DOCUMENTS

| 3254 | 5/1955 | Japan . | |
| 4732 | 2/1958 | Japan | 60/602 |
| 25428 | 8/1965 | Japan . | |
| 8306 | 1/1975 | Japan | 60/602 |
| 2412 | 1/1976 | Japan . | |
| 148224 | 10/1983 | Japan | 60/602 |
| 32620 | 2/1984 | Japan | 60/602 |
| 1389410 | 4/1975 | United Kingdom . | |

Primary Examiner—Michael Koczo
Attorney, Agent, or Firm—Oldham, Oldham & Weber Co.

[57] ABSTRACT

A variable-volume turbocharger device comprises at least two exhaust gas passages (A), (B) different in the flow characteristics, divided by a partition wall (20) provided in a turbine housing (18), and two valve members (34a), (34b) which are actuated so as to open and shut the exhaust gas passages (A), (B). The valve members (34a), (34b) each are actuated to open and shut in response to the speed and load of an engine or the likes, whereby either one of the exhaust gas passages (A), (B) or both of them are opened to provide at least three turbine flow characteristics. An exhaust gas turbine (12) can be thereby operated with remarkably good efficiency suitably to the operating state of the engine.

12 Claims, 31 Drawing Figures

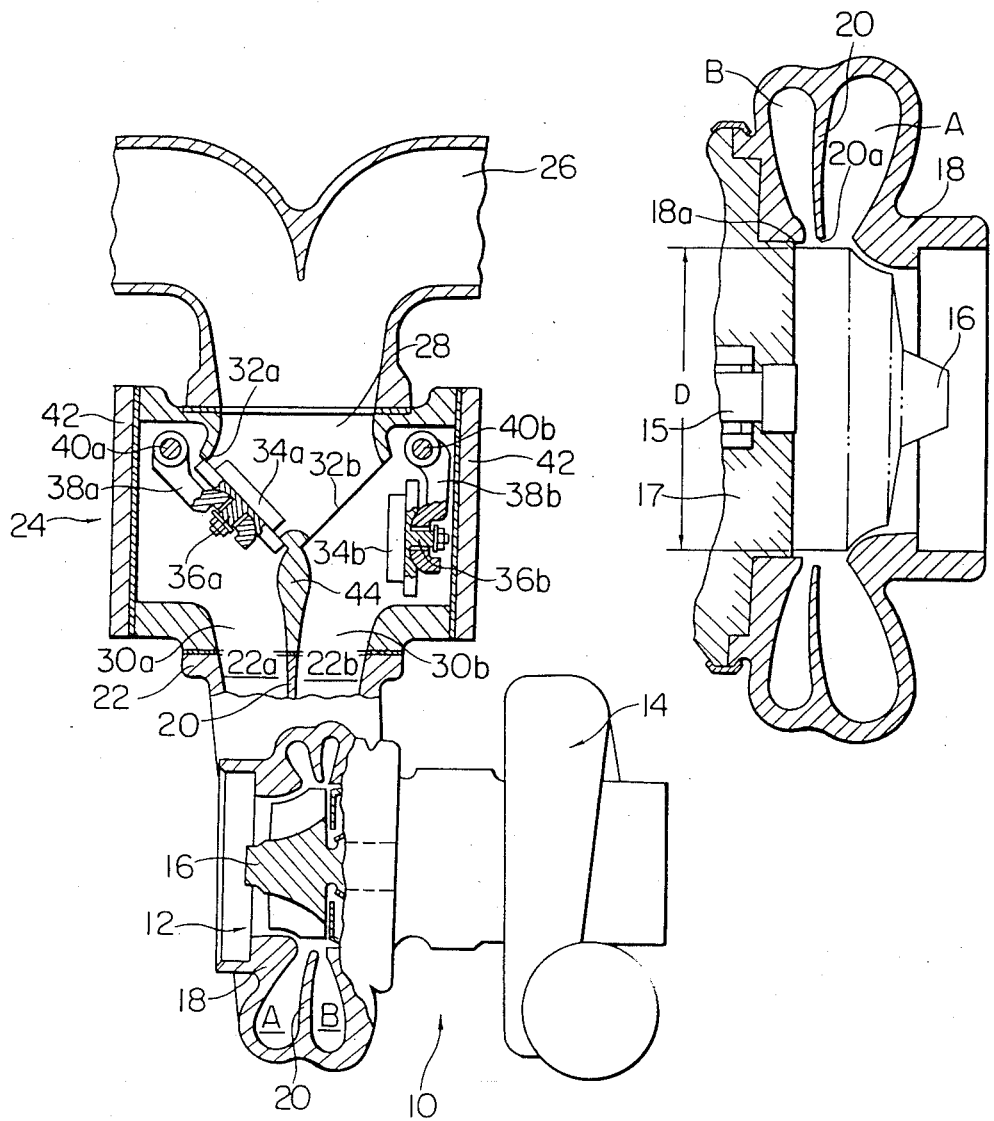

| ENGINE SPEED | (A) Ne<Neo | | | (B) Neo≦Ne<Ne1 | | | (C) Ne1≦Ne<Ne2 | | | (D) Ne2≦Ne | | |
|---|---|---|---|---|---|---|---|---|---|---|---|---|
| LOAD SENSOR | ○ | | × | ○ | | × | ○ | | × | ○ | | × |
| ACCELERATOR PEDAL SENSOR | × | ○ | × | × | ○ | × | × | ○ | × | × | ○ | × |
| STATE OF FLOW PASSAGE AREA | | B1 | | B1 | B1(B1→B3) | B3 | B2 | B1(B1→B3) | B3 | B3 | B1(B1→B3) | B3 |

B1 ----- MINIMUM IN FLOW PASSAGE AREA
B2 ----- MEDIUM IN FLOW PASSAGE AREA
B3 ----- MAXIMUM IN FLOW PASSAGE AREA
○ ----- ON
× ----- OFF

VARIABLE-VOLUME TURBOCHARGER

TECHNICAL FIELD

The present invention relates to an improvement in a turbocharger device in which an exhaust gas turbine is driven by the exhaust gas of an engine and a compressor for pressurizing the intake air of said engine is driven by the gas turbine.

BACKGROUND ART

An engine for motor vehicles such as automobiles is operated through an extremely wide area of engine speed ranging from an idling speed to the maximum speed and within a widely varying load range, and the quantity of its exhaust gas varies by a large margin. In an exhaust gas turbine having a single flow characteristics, therefore, it is not possible to recover and utilize the energy of the exhaust gas discharged from an engine thoroughly. So, a variable-volume turbocharger device has been already proposed in which a partition wall is provided in a turbine housing to divide the exhaust gas passage in said housing into two exhaust gas passages different in the flow characteristics and valve means are provided which are switchable to open either one of said divided exhaust gas passages, wherein said valve means are switched over to operate in accordance with the operating conditions such as the engine speed and load, thereby to improve the operational efficiency of the exhaust gas turbine.

In such a conventional variable-volume turbocharger device, two turbine flow characteristics can be obtained, but it is desirable to obtain plural turbine flow characteristics suited for the operating conditions of an engine.

The turbine housing of a turbocharger device can not be expected to be highly precise because it is manufactured by casting. Thus, it is difficult to form said partition wall and a turbine rotor in close relationship with high precision and a large clearance must be provided between the partition wall and the turbine rotor. In this case, the exhaust gas passage leading from the fore end of the partition wall to the turbine rotor is rapidly enlarged, with a disadvantage of resulting in loss.

DISCLOSURE OF INVENTION

It is a main object of the present invention to provide a variable-volume turbocharger device improved so that more turbine flow characteristics suited for the operating conditions of an engine can be obtained.

In order to achieve this object, the present invention proposes a variable-volume turbocharger device comprising a turbine housing having at least two exhaust gas passages different in the flow characteristics, divided by a partition wall, and two valve means for opening and shutting each of said exhaust gas passages selectively in response to the operating state of an engine to make the turbine flow characteristic variable.

According to the abovementioned composition, either one of the exhaust gas passages or both of them are opened by actuating these valve means to open or shut suitably in response to the operating state of the engine, whereby at least three turbine flow characteristics can be obtained and the exhaust gas turbine can be operated properly and with good efficiency. Besides, it is possible to shut both the exhaust gas passages at the same time, thereby to exhibit the exhaust braking function.

It is another object of this invention to provide a method for manufacturing a turbine housing for a turbocharger device, in which the fore end of the partition wall of the turbine housing can be formed in close relationship to a turbine rotor, in order that a loss caused by the rapid enlargement of its exhaust gas passage can be avoided.

To achieve this object, this invention proposes a method for manufacturing a turbine housing for a turbocharger device having at least two exhaust gas passages different in the flow characteristics, divided by a partition wall provided in its inside, which comprises previously forming an end member as a separate body from said partition wall, and then securing said end member on the inner circumferential part of said partition wall.

According to this method, the clearance between the fore end of said end member and a turbine rotor can be minimized, and a loss caused by the rapid enlargement of the exhaust gas passage between them can be avoided.

Furthermore, the present invention relates to a method for controlling a variable-volume turbocharger device, and proposes a method for controlling a variable-volume turbocharger device comprising at least two exhaust gas passages different in the flow characteristics, divided by a partition wall provided in a turbine housing, and two valve means for actuating each of said exhaust gas passages so that they are opened or shut, in which either one of said valve means or both of them are actuated to open in response to the operating state of an engine, thereby to provide three different turbine characteristics of large, medium and small flow rates.

BRIEF DESCRIPTION OF DRAWINGS

FIG. 1 is a vertical sectional view of the first embodiment of the variable-volume turbocharger device according to the invention, FIG. 2 is an enlarged sectional view showing the turbine housing of FIG. 1.

BEST MODE FOR CARRYING OUT THE INVENTION

Figure 3:
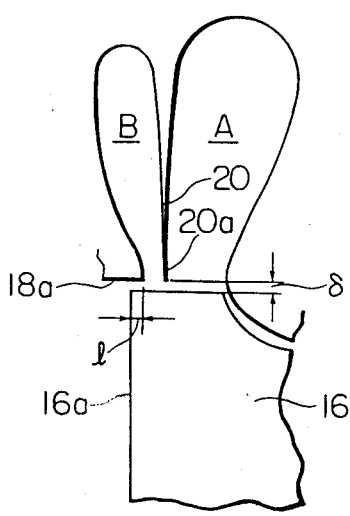
FIG. 3 is an enlarged view showing the principal part of FIG. 2.

A number of embodiments according to this invention will be described in detail with reference to the accompanying drawings.

In the following descriptions and drawings, the corresponding elements having the same or similar function are designated by the same reference numerals.

In the first embodiment according to this invention shown in FIG. 1 to FIG. 6, the reference numeral 10 represents generally a variable-volume turbocharger device, 12 is an exhaust gas turbine thereof, and 14 is a compressor driven by the exhaust gas turbine 12. The exhaust gas turbine 12 has a turbine housing 18 accomodating a rotor 16, and in the inside of the housing 18, there are provided exhaust gas passages, i.e. scrolls A and B divided in the direction of the rotor axis by a radial partition wall 20, which are different in the flow characteristics. A valve casing 24 mentioned below is connected to the exhaust gas inlet 22 of said housing 18, and the valve casing 24 is further connected with the exhaust device of an engine (not shown). This is an exhaust manifold 26 in this embodiment. In the exhaust gas inlet 22, there are provided inlets 22a and 22b divided by the extended portion of the partition wall 20 and each reaching down to the exhaust gas passages A, B.

The valve casing 24 is almost box-like in the external shape, and the upper wall surface thereof is provided with an upstream opening 28 communicating to the exhaust manifold 26 and the lower wall surface thereof is provided with downstream openings 30a, 30b connecting respectively to the inelts 22a, 22b, as shown in FIG. 1. Between the upstream opening 28 and the downstream openings 30a, 30b, in this embodiment, there are provided valve seats 32a, 32b, having seating surfaces on two planes which intersect each other in the V-shaped form at an angle of 90° made between them, and the valve openings of these valve seats will be opened and shut by valve members 34a, 34b, respectively. The valve members 34a, 34b each have a protruded shafts 36a, 36b on their back surface, and the protruded shafts 36a, 36b each are supported on the free end of a rocker arm 38a, 38b, with enough clearance existing in the radial direction, and the valve members 34a, 34b each are supported on the rocker arms 38a, 38b by spherical seats. The other ends of the respective rocker arms 38a, 38b are secured on a support shaft 40a, 40b pivotally supported on the side wall relatively at the upstream side of the valve casing 24. The valve casing 24 has openings at both the right and left sides, in FIG. 1, for attachment, removal and check of the valve members 34a, 34b, and these openings are normally closed by detachable lids 42. The reference numeral 44 represents a partition wall placed in the valve casing 24 and connecting to the partition wall 20 of the turbine housing inlet 22.

In the aforementioned device, the support shafts 40a, 40b which will open and shut the valve members 34a, 34b by way of the rocker arms 38a, 38b are connected to proper actuators (not shown) such as pneumatic responsive devices so as to be actuated to open and shut these valve members in accordance with the operating state of the engine (not shown), for example the engine speed and load.

Figure 5:
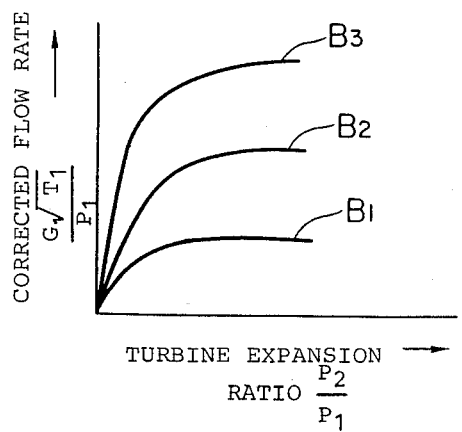
FIG. 5 is a diagram of the turbine flow characteristic of the turbocharger device.

In this embodiment, the flow characteristic $B_2$ of the exhaust gas passage A in the turbine housing 18 is set at one larger than that $B_1$ of the passage B, as shown in FIG. 5. As for the characteristic diagram shown in FIG. 5, the corrected flow rate will be represented by the formula $G\sqrt{T_1}/P_1$ and the expansion ratio by the formula $P_2/P_1$, wherein the designation G is the flow rate of the exhaust gas, $T_1$ is the temperature of the exhaust gas at a turbine inlet, $P_1$ is the pressure of the exhaust gas at the turbine inlet, and $P_2$ is the pressure of the exhaust gas at a turbine outlet.

As shown in FIG. 2 and FIG. 3 showing the exhaust gas turbine 12 in enlargement, the inner peripheral surface 18a of the turbine housing 18 defining the exhaust gas passage B and the inward end 16a of the turbine rotor 16 overlap each other in the direction of the axis of the turbine rotor. In FIG. 3, the inner peripheral surface 18a overlaps on the turbine rotor 16 only by a length l in the direction of the turbine rotor axis. After due consideration of the dimensional tolerances of a shaft 15 supported on a center housing 17 of the turbocharger device, the turbine rotor 16 and the turbine housing 18, this length l is set such that the inner peripheral surface 18a and the inward end 16a overlap each other positively even when these tolerances are in the worst condition.

Figure 4:
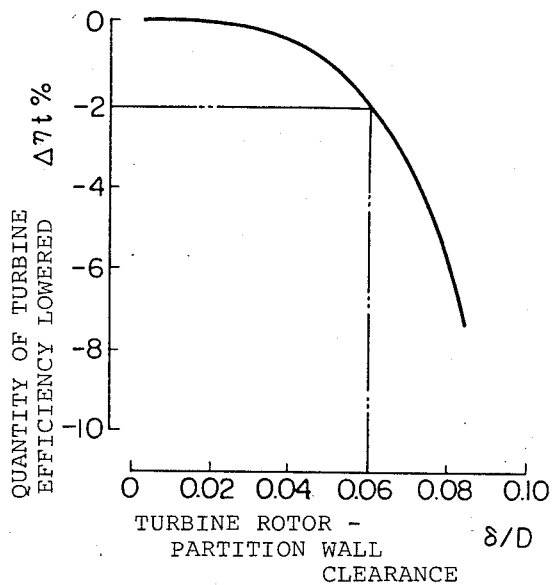
FIG. 4 is a diagram showing the relationship between the quantity of the turbine efficiency lowered and the turbine rotor-partition wall clearance.

The clearance δ between the inner circumferential edge 20a of the partition wall 20 and the outer circumferential edge of the turbine rotor 16 is set as follows. Representing the diameter of the turbine rotor by the letter D (see FIG. 2), the value of the abovementioned clearance δ is set such that the inequality $\delta/D \leq 0.06$ is satisfied. The reason that the clearance δ is so set will be described with reference to FIG. 4. In FIG. 4, there is exhibited a relationship between the quantity of the turbine efficiency lowered Δηt and the turbine rotor-partition wall clearance $\delta/D$. Assuming that the turbine efficiency $\eta t$ is 0.7 and the compressor efficiency $\eta c$ is 0.7, the overall efficiency $\eta$ all $=\eta t \times \eta c$ becomes 0.49. When the turbine efficiency is lowered 2%, the turbine efficiency $\eta t$ becomes 0.686 and the overall efficiency $\eta$ all $=\eta t \times \eta c$ becomes $0.686 \times 0.7 = 0.48$. Namely, the 2% reduction in the turbine efficiency results in a lowering of about 1% in the overall efficiency. In a case that the turbine efficiency exceeds 2% in the maximum, the performance of the engine in the fuel consumption is normally worsened seriously. When the turbine rotor-partition wall clearance $\delta/D$ is below 0.06, the quantity of the turbine efficiency $\eta t$ lowered becomes large suddenly with the increase in the value of the clearance $\delta$. This means that when the turbine rotor-partition wall clearance $\delta/D$ is below 0.06 in consideration of the machining tolerance of the clearance $\delta$, the lowering of the turbine efficiency $\delta t$ varies widely due to the variations of the clearance $\delta$. As can be seen from FIG. 4, accordingly, it is preferred to set the value of clearance $\delta$ such that the inequality $\delta/D \leq 0.06$ is satisfied.

In the preferred operational mode of the exhaust gas turbine 12, the state just shown in the drawing, this is the state in which the valve member 34a is closed but the valve member 34b is opened, stands when an engine is in a low speed, high load operation (in the region $B_1$ of FIG. 6), and as a result, the exhaust gas from the exhaust manifold 26 passes through the exhaust gas passage B from the upstream opening 28, the valve opening of the valve seat 32b, the corresponding downstream opening 30b and the inlet 22b of the turbine housing, and acts upon the blades of the rotor 16 so that the exhaust gas turbine 12 is operated with efficiency, in accordance with the flow characteristic $B_1$ shown in FIG. 5. Under such a state, the opened valve member 34b cooperates with the partition wall 44 to form, in the valve casing 24 at the downstream side from the valve seat 32b, an exhaust gas passage which is almost gently bent and small in resistance, and on the other hand, the valve member 34a which seats on the valve seat 32a included in a plane which intersects the plane including the valve seat 32b at an angle of about 90° formed therebetween, provides a portion of the passage wall at the upstream side from the valve seat 32b to form an exhaust passage which is gently sloping and small in resistance.

When the engine is operating in a medium speed, high load state (in the region $B_2$ of FIG. 6), the valve member 34a is opened and the valve member 34b is closed, and as a result, the exhaust gas is fed to the turbine rotor 16 through the exhaust gas passage A which is larger in flow characteristic, in the mode quite similar to the abovementioned mode. Thus, the exhaust gas turbine 12 is operated in accordance with the flow characteristic $B_2$ shown in FIG. 5. Also in this case, a gently sloping passage small in flowing resistance is formed similarly to the above case, because the valve seats and the exhaust gas passages are formed almost symmetrically at both the sides of the partition wall 44 in the valve casing 24, as shown in the drawing.

When the engine is in a low load operation, without reference to its engine speed, or in a high speed, low load operation (in the region $B_3$ of FIG. 6), both the valve members 34a, 34b are opened together, and as a result, the exhaust gas which has flowed from the upstream opening 28 into the valve casing 24 passes through the passages divided right and left by means of the central partition wall 44, and the divided flows of the exhaust gas flow from the downstream openings 30a, 30b into the inlets 22a, 22b of the turbine housing respectively, and fed from both the exhaust gas passages A, B to the turbine rotor 16. Thus, the exhaust gas turbine 12 is operated in accordance with the flow characteristic $B_3$ shown in FIG. 5. Also in this case, the opened valve members 34a, 34b cooperate with the partition wall 44 to serve as one side wall of the exhaust gas passage.

As an example in which the present invention is applied, there may be provided, in the exhaust gas turbine housing, a third exhaust gas passage other than the passages A, B in the abovementioned embodiment, and the third passage in this case may be a passage having no valve or may be adapted to be opened and shut by a third valve other than the valve members 34a, 34b.

In the variable-volume turbocharger device according to the present invention, as abovementioned, at least two inlets partitioned by a partition wall are provided in the portion of a turbine housing where an exhaust gas is introduced, and these inlets are connected with the exhaust device of an engine by way of valve means, respectively. Thus, the variable-volume turbocharger device has such effects that the exhaust gas can be fed to the exhaust gas turbine in accordance with the turbine flow characteristics suited to the operated state of the engine by actuating the valve means selectively for their opening and shutting, and as a result, the turbine can be properly operated with good efficiency.

The provision of a valve casing in which the valve seats and valve members are arranged in a special mode between the exhaust gas turbine of a turbocharger device and the exhaust device of an engine such as the exhaust manifold, is very advantageous, because the exhaust gas can be fed to the exhaust gas turbine through a selected passage which is proper and small in flowing resistance, in response to the operating state of the engine, with the pressure loss of the exhaust gas reduced. As can be seen from the descriptions on the aforementioned embodiment, furthermore, it is most preferable to arrange the valve seats 32a, 32b on the planes which intersect each other at an angle of about 90° (these planes are not always flat planes), but it is capable to modify this angle of intersection widely from about 60° to 120°, with obtaining the same effects nearly. In addition, the valve casing can be manufactured, assembled and exchanged at need, as one unit, and this is convenient in practice.

In case the turbine rotor 16 is being rotated in accordance with the flow characteristics $B_3$ and $B_2$ in FIG. 5, the leakage of the exhaust gas at the time when it flows through both the exhaust gas passages A, B or through the exhaust gas passage A to rotate the turbine rotor does not become a serious question. When the exhaust gas is caused to flow only through the exhaust gas passage B, however, the leakage of the exhaust gas has a great influence upon the generation of increased pressure, because the flow characteristic $B_1$ of the passage B is small. Thus, in the present invention, the turbine housing 18 and the turbine rotor 16 are overlapped in the direction of the rotor axis, with an effect capable of reducing the loss of energy due to the leakage of the exhaust gas to the utmost.

In the first embodiment mentioned above, the cross-sectional contours of the upstream opening 28 of the valve casing 24, the valve openings of the valve seats 32a, 32b and the exhaust gas passages leading from said valve openings to the downstream openings 30a, 30b, may be in any shape of an oblong rounded in four corners, oval, ellipse or circle, or may be a combination of them. As a matter of course, the contour of the valve members 34a, 34b is preferably in a shape nearly similar to that of the valve openings of the valve seats 32a, 32b. Furthermore, it is possible to arrange the valve means including the valve members 34a, 34b in the inlets 22a, 22b of the turbine housing 18 by way of the rocker arms 38a, 38b pivotally supported on the housing respectively, instead of arranging them in the valve casing 24. In this case, the valve members 34a, 34b will be engaged with valve seats provided at the opening part of the turbine housing inlet 22 and adapted to open toward the downstream side in the flowing direction of the exhaust gas.

Figure 7:
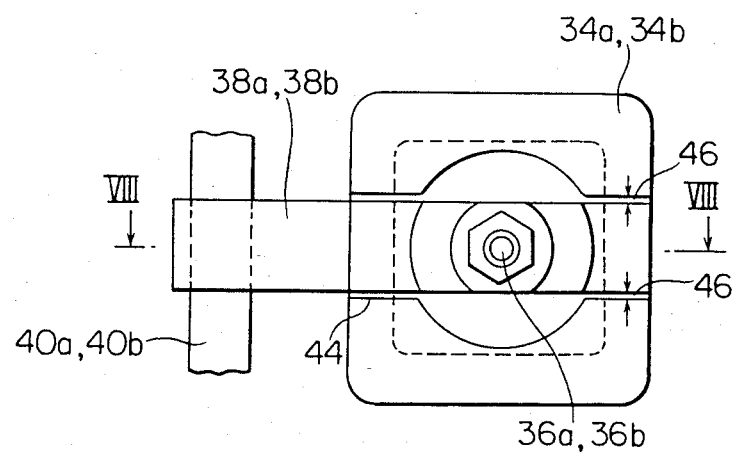
FIG. 7 is an enlarged plan view showing the first modification of the valve means.
Figure 8:
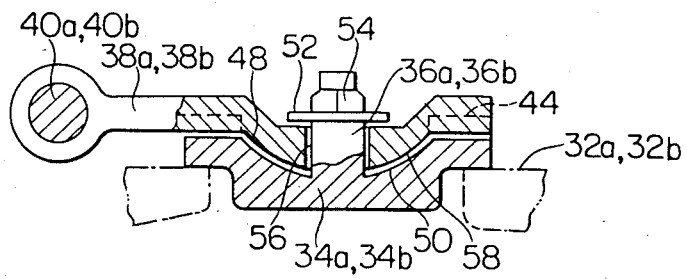
FIG. 8 is a vertical sectional view taken along the line VIII—VIII of FIG. 7.

FIG. 7 and FIG. 8 show the first modification of the valve means used in the aforementioned first embodiment, wherein it is aimed to improve the smoothness of their opening and shutting operation and the performance of their sealing.

As illustrated in detail by FIG. 7 and FIG. 8, the plane contour of the valve member 34a, 34b is of a square rounded in four corners, and the valve seat 32a, 32b which cooperates with the valve member is made in a shape nearly similar thereto, in this embodiment. In order that the close fitting of the valve member 34a, 34b to the valve seat is prevented from being broken by the turning of the valve member 34a, 34b and the rocker arm 38a, 38b around the protruded shaft 36a, 36b, therefore, the rocker arm 38a, 38b is adapted to be inserted in a groove 44 provided in the valve member 34a, 34b, with a proper gap 46 existing therebetween. The valve member 34a, 34b and the rocker arm 38a, 38b cooperate with each other by way of spherical surfaces 48 and 50 which fit to each other, and a lock washer 52 is fixed on the protruded shaft 36a, 36b by means of a nut 54. There are a proper radial clearance 56 between the protruded shaft 36a, 36b and the rocker arm 38a, 38b and a clearance 58 in the direction of the axis of the protruded shaft between the spherical surfaces 48 and 50.

By turning the support shaft 40a clockwise in FIG. 8 by means of the aforementioned actuator when the valve member 34a is closed, the end of the valve member 34a at the remote side from the support shaft 40a is first brought into contact with the corresponding portion of the valve seat 32a, and then the valve member 34a is guided for closure movement by the spherical surfaces 48 and 50 due to the existence of said clearances 46, 56 and 58 so as to be fitly seated on the position shown in FIG. 8. At that time, all of the valve seat 32a, valve member 34a and protruded shaft 36a do not undergo any unnatural force due to the existence of said clearances, and the valve member 34a and valve seat 32a can be closely fitted to each other in a proper state, ensuring an excellent sealing property. The portions which must be relatively displaced from each other, this is the protruded shaft 36a and rocker arm 38a, do not adhere to each other, because there is enough clearance between them as mentioned above, and the support shaft 40a is also not likely to adhere and its operation is smooth and accurate, because it is not in direct contact with a high temperature exhaust gas. This fact will be applied similarly to the other valve member 34b.

Figure 9:
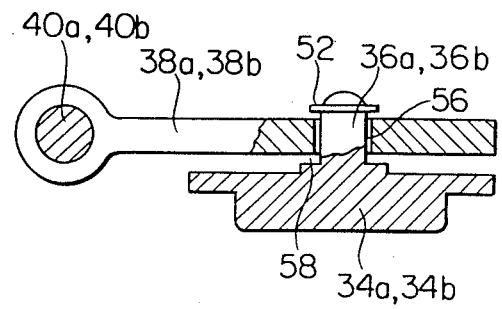
FIG. 9 is a vertical sectional view showing the second modification of the valve means.

FIG. 9 shows the second modification of the valve means according to the aforementioned first embodiment.

In the second modification shown in FIG. 9, the rocker arm 38a, 38b and the valve member 34a, 34b are formed so as to be in contact with each other on plane seats and the lock washer 52 is suitably secured on the protruded shaft 36a, 36b. Also in this case, a proper clearance 56 is provided between the protruded shaft 36a, 36b and the corresponding insertion hole of the rocker arm 38a, 38b, and a proper clearance 58 in the direction of the axis of the protruded shaft 36a, 36b is further provided between the rocker arm and the valve member, whereby the valve member 34a, 34b can be closely fitted to the valve seat 32a, 32b cooperating therewith, smoothly and fitly.

Figure 10:
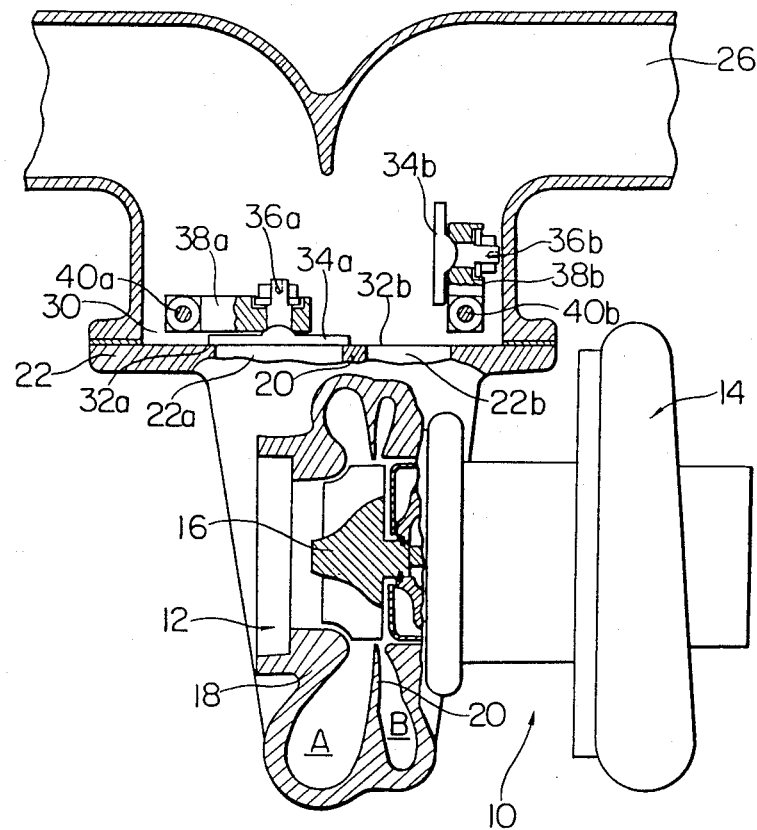
FIG. 10 is a vertical sectional view of the turbocharger device showing the second embodiment of the invention.
Figure 11:
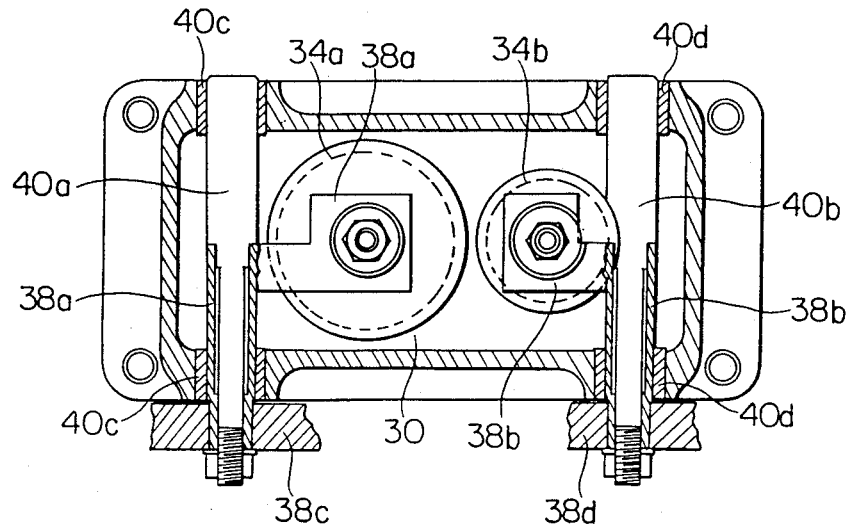
FIG. 11 is an enlarged transverse sectional view showing the valve means of FIG. 10.

Although the valve members 34a, 34b of the valve means are arranged so as to be opened toward the downstream side in the flowing direction of the exhaust gas with respect to the valve seats 32a, 32b, in the first embodiment according to the present invention shown in FIGS. 1 to 6, the second embodiment of this invention shown in FIG. 10 and FIG. 11 is different from the aforementioned first embodiment, at such a viewpoint that valve members are arranged so as to be opened toward the upstream side in the flowing direction of an exhaust gas with respect to valve seats.

In FIG. 10, the exhaust gas inlet 22 of an exhaust gas turbine 12 is directly connected with the outlet gathered portion 30 of an exhaust device of an engine. This is an exhaust manifold 26 in this embodiment. On the flat end surface of the exhaust gas inlet 22, valve seats 32a, 32b are formed around inlets 22a, 22b leading to exhaust gas passages A, B, respectively. Valve members 32a, 32b which cooperate with the valve seats 32a, 32b are arranged in the outlet gathered portion 30. The valve members 34a, 34b each have a protruded shaft 36a, 36b on their back surface, the protruded shafts 36a, 36b each are supported on the free end of a rocker arm 38a, 38b, with an enough clearance existing in the radial direction, and the valve members 34a, 34b each are supported on the free end of the rocker arm by way of spherical seats. The other end of the respective rocker arms 38a, 38b is secured on a support shaft 40a, 40b which is pivotally supported through a bush on the side wall of the outlet gathered portion 30 of the exhaust manifold 26 connecting with the exhaust gas inlet 22 of a turbine housing 18. In this embodiment, there is therefore no need of providing the valve casing used in the aforementioned first embodiment, and as a result, it is possible to compact and lighten the whole of a turbocharger device.

As illustrated in detail in FIG. 11, bushes 40c and 40d are fitted into the side walls of the outlet gathered portion 30 of the exhaust manifold 26, and the support shafts 40a, 40b each are individually inserted in the rocker arm 38a, 38b supporting the valve member 34a, 34b by way of the protruded shaft 36a, 36b, and pivotally supported at both their ends in the bushes 40c, 40d.

As materials for improving the wear resistance of these members which must be used at high temperatures caused by exhaust gas and under a non-lubricated state, it is advantageous to use, by way of example, martensitic steel for the support shafts 40a, 40b and rocker arms 38a, 38b when martensitic chromium carbide-precipitated steel is employed for the bushes 40c, 40d, and to use martensitic chromium carbide-precipitated steel for the support shafts and rocker arms when ceramic such as zironia or alumina is employed for the bushes.

The support shafts 40a, 40b which serve to open and shut the valve members 34a, 34b are connected with actuators such as pneumatic responsive devices by way of levers 38c, 38d, as well as the aforementioned first embodiment.

In addition, the structure of the other parts in the turbocharger device, especially of the turbine housing 18, is the same as in the first embodiment, and its operation and effect are also the same.

Furthermore, it is possible to arrange, in the valve casing, the valve means adapted to open toward the upstream side, similarly to the aforementioned first embodiment.

Figure 12:
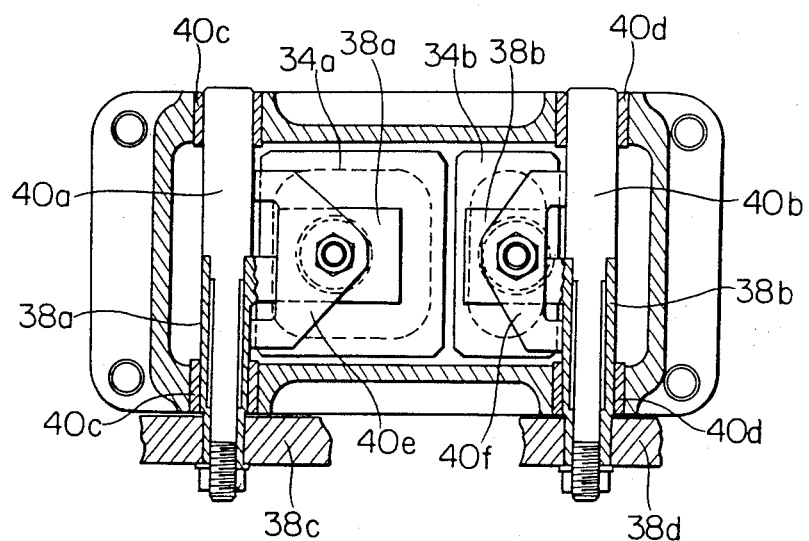
FIG. 12 is an enlarged transverse sectional view showing the first modification of the valve means of the second embodiment.
Figure 13:
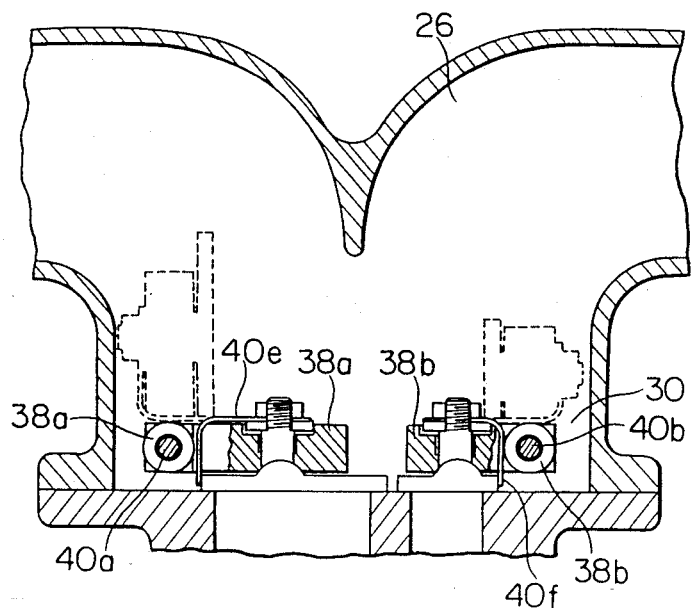
FIG. 13 is a vertical sectional view of FIG. 12.

FIG. 12 and FIG. 13 show the first modification of the valve means used in the abovementioned second embodiment.

In this first modification, the plane contour of the valve member 34a, 34b is of a rectangle rounded in four corners, and the valve seats 32a, 32b which cooperate with the valve member are made in a shape nearly similar thereto. In order that the valve member 34a, 34b and the rocker arms 38a, 38b are not turned around the protruded shaft 36a, 36b, therefore, stopper member 40e, 40f is provided. The stopper member 40e, 40f is a plate having a bent portion for holding down the side wall of the valve member 34a, 34b, which plate is clamped on the protruded shaft 36a, 36b, with the engagement of the valve member 34a, 34b therewith.

Figure 14:
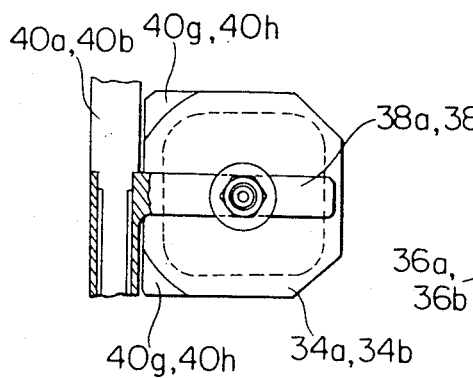
FIG. 14 is a partially enlarged transverse sectional view showing the second modification of the valve means of the second embodiment.
Figure 15:
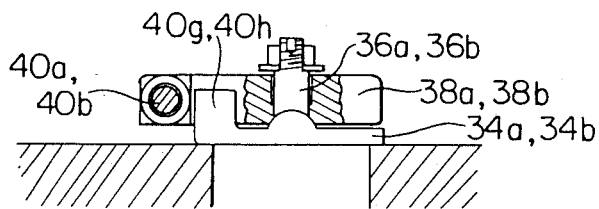
FIG. 15 is a vertical sectional view of FIG. 14.

FIG. 14 and FIG. 15 show the second modification of the valve means used in the aforementioned second embodiment.

This second modification exhibits another structure adapted to prevent the turning of the valve members 34a, 34b in the case the valve members are not in the shape of a circle (for example, they are in a rectangle). A stopper portion 40g, 40h is integratedly protruded as a turn preventing means on the corner of the valve member 34a, 34b at the side of the support shaft 40a, 40b. Although the valve member 34a, 34b is going to turn, therefore, its turning can be prevented because the stopper portion 40g, 40h collides with the support shaft 40a, 40b.

Figure 16:
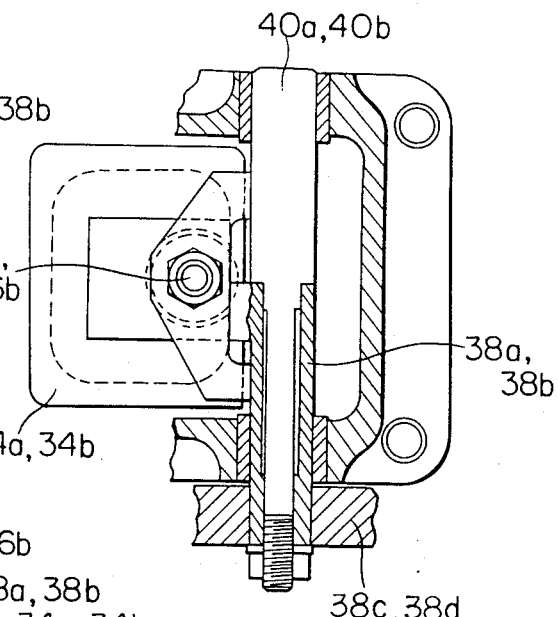
FIG. 16 is a partially enlarged transverse sectional view showing the third modification of the valve means of the second embodiment.

FIG. 16 shows the third modification of the valve means used in the aforementioned second embodiment, in which the difficulty in opening of the valve members 34a, 34b caused by the action of the exhaust gas pressure has been taken into consideration in the case that the valve members are of the shape of a rectangle as mentioned above.

As seen from FIG. 16, the supporting point of the protruded shaft 36a, 36b for the valve member 34a, 34b is positioned at a position staggered to the side of the support shaft 40a, 40b with respect to the cross-sectional center of the flow passage of the valve seat 32a, 32b, and the rocker arm 38a, 38b is formed short. In order that the valve member 34a, 34b is caused to open against the exhaust gas pressure, there is required a force having the same magnitude as the exhaust gas pressure or the differential pressure between both the sides of the valve member, in a case that the cross-sectional center of the flow passage and the supporting point for the valve member accord with each other. In this modification, however, the supporting point for the valve member 34a, 34b is offset to the side of the support shaft 40a, 40b from the cross-sectional center of the flow passage. In the opening operation of the valve member 34a, 34b, therefore, a working force for opening the valve member 34a, 34b is applied to the protruded shaft 38a, 38b in such a mode that the outer end of the valve member (on the side of the support shaft 40a, 40b) is first lifted up, with a portion where the inner end of the valve member (at the opposite side to the support shaft) and the valve seat 32a, 32b are in contact with each other as a fulcrum and the valve member is then opened. As a result, the exhaust gas is permitted to flow out of the gap at the outer end of the valve member 34a, 34b and the differential pressure between both the sides of the valve member is reduced, whereby the force required to open the valve member becomes small. Accordingly, it is possible to compact the actuator for opening the valve member, by offsetting the supporting point for the valve member, as mentioned above.

Figure 17:
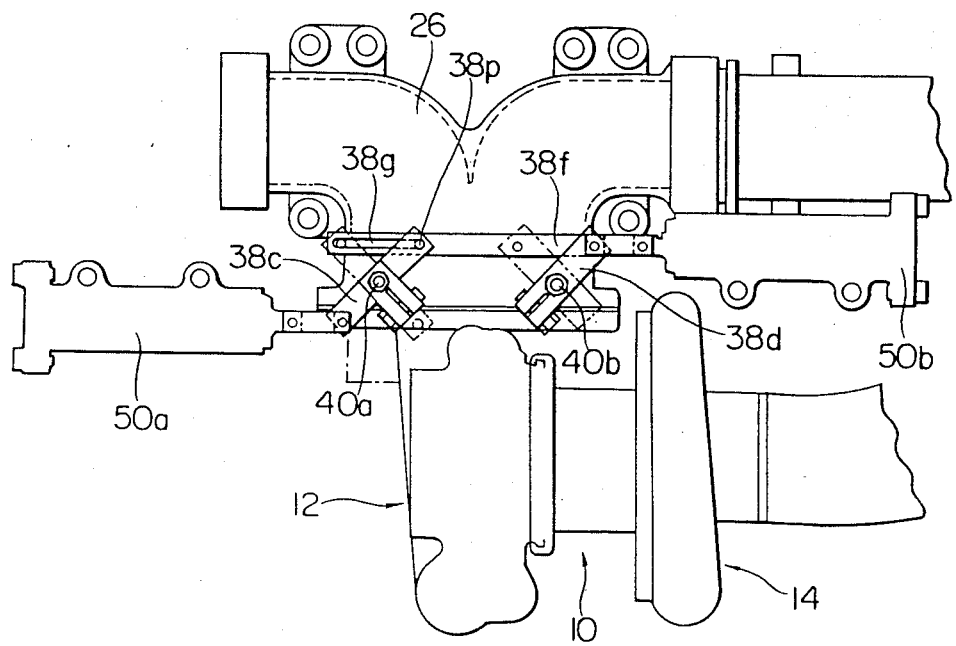
FIG. 17 is a general view of a turbocharger device equipped with a driving mechanism showing the third embodiment of the invention.

The third embodiment of the present invention shown in FIG. 17 relates to a driving mechanism for opening and shutting the valve means used in the aforementioned second embodiment.

The variable-volume turbocharger device according to the second embodiment has such as structure that the valve members of the valve means are adapted to open toward the upstream side with respect to the valve seats. The opening operation of the valve member 34a in an exhaust gas passage with a larger flow passage area, this is the exhaust gas passage A, needs therefore an actuator 50a such as an air cylinder capable of giving a large working force enough to overcome a large pressure which is applied onto the valve member by the exhaust gas pressure. In order to carry out the opening operation of the valve member 34a by a smaller working force, in this third embodiment, an opening and shutting lever 38c secured on the support shaft 40a of the valve member 34a and an opening and shutting lever 38d secured on the support shaft 40b of the valve member 34b are connected with each other by means of a link 38f so that in the opening operation of the valve member 34a, an actuator 50b for actuating the valve member 34b in an exhaust gas passage with a smaller flow passage area, this is the exhaust gas passage B, assists the opening of the valve member 34a to be effected by the actuator 50a. One end of the link 38f is pivotally secured on the lever 38d and actuator 50b. On the other hand, the lever 38c is engaged and pivotally supported, for sliding a given distance, in an elongate hole 38g formed on the other end of the link 38f by way of a pin 38p secured on its one end, and the other end of the lever 38c is pivotally secured on the actuator 50a.

Next, the operation of the link mechanism which assists the opening of the valve member 34a in the exhaust gas passage A with a larger flow passage area, will be described. FIG. 17 shows the state that the valve member 34a is closed and the valve member 34b in the exhaust gas passage B with a smaller flow passage area is opened. When the valve member 34a is opened and the valve member 34b is shut from this state, the actuators 50a, 50b rotate the levers 38c, 38d counterclockwise, seen in the drawing, toward the dotted line positions, respectively. At that time, the working force of the actuator 50b is applied to the lever 38c by way of the link 38f through the engagement of the pin 38p of the lever 38c with the right end (seen in the drawing) of the elongate hole 38g of the link 38f so as to assist the opening of the valve member 34a to be effected by the actuator 50a. When only the valve member 34b is actuated to open from that state, however, the lever 38d is rotated clockwise (seen in the drawing) by means of the actuator 50b, whereby the elongate hole 38g of the link 38f is merely caused to slide with respect to the pin 38p secured on the lever 38c.

From this construction, the opening of the valve member 34a with a larger flow passage area can be assisted by the actuator 50b for the valve member 34b with a smaller flow passage area, and it is therefore possible to eliminate the useless oversizing of the actuator 50a and to aim the compacting of the whole device.

In the aforementioned embodiment, both the actuators 50a, 50b are positioned at both the sides of the exhaust manifold 26, but they can be arranged in parallel on either side. In this case, it is possible to more compact the whole device.

In addition, the abovementioned link mechanism can be also used in the turbocharger device according to the aforementioned first embodiment wherein the valve members of the valve means are adapted to open toward the downstream side with respect to the valve seats. In this case, the link mechanism can assist a working force for shutting the valve member 34a in the exhaust gas passage A with a larger flow passage area.

Figure 18:
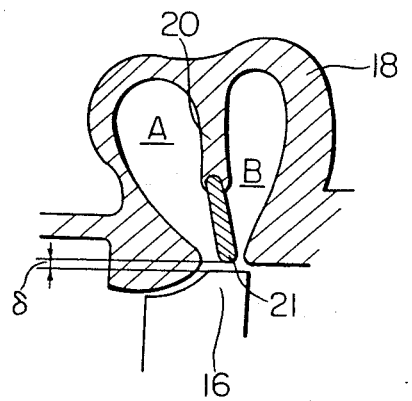
FIG. 18 is a partially enlarged vertical sectional view of the turbine housing showing the fourth embodiment of the invention.
Figure 19:
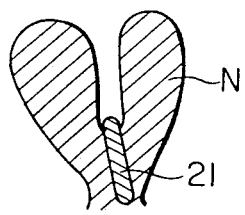
FIG. 19 is a typical view showing a core used to manufacture the turbine housing of FIG. 18, FIGS. 20 to 22 each are a plan view showing a different modification of the end member of FIG. 18.

The fourth embodiment according to the present invention shown in FIG. 18 and FIG. 19 is one in which the inner circumferential end of the partition wall 20 of the turbine housing 18 in the first and second embodiments is not integrated with the same partition wall, but a separate body therefrom.

The partition wall 20 is more heated in the portion nearer to its inner circumferential side, and the turbine housing 18 on the partition wall 20 may be therefore broken owing to the thermal stress caused by the difference in thermal expansion between the turbine housing on the outer circumferential side and the partition wall on the inner circumferential side. Since it is difficult to form the partition wall 20 so that it gives access to the outer peripheral edge of the turbine rotor 16 because of its manufacturing technique, the clearance between the partition wall and the turbine rotor becomes large, with resulting in the quick enlargement of the exhaust gas passage which leads from the fore end of the partition wall to the turbine rotor, and the loss of energy is caused.

As shown in FIG. 18, there is fitted an annular end member 21 made as another body to the inner circumferential part of the partition wall 20 through a manufacturing method which will be described below. The end of the end member 21 is adapted to approach the outer peripheral edge of the turbine rotor 16. As a result, the exhaust gas passages A, B each are not enlarged quickly in their portion which leads to the outer peripheral edge of the turbine rotor 16, and they are mainly devised to lead to the turbine rotor 16 smoothly.

Since the end member 21 is made of another material which has a coefficient of thermal expansion lower than that of the material of the turbine housing 18, the thermal expansions of the end member 21 and the turbine housing 18 become almost equal to each other, even if the end member 21 is more heated than the turbine housing 18. Thus, thermal stress between the end member 21 and the turbine housing 18 is prevented. For example, maltensitic stainless steel can be used as a material with a lower coefficient of thermal expansion for the end member 21, and spherical graphite cast iron as a material for the turbine housing 18.

Owing to this composition aforementioned, the turbine housing 18 and partition wall 20 are heated by high temperature exhaust gas flowing thereinto in the operation of the turbocharger device 10, and in particular the end member 21 at the inner circumference of the partition wall 20 is more heated than the turbine housing 18 and the outer circumferential side of the partition wall 20, because it has no radiating portion and is in better contact with the high temperature gas. But, since the end member 21 is made of a material which has a coefficient of thermal expansion lower than that of the turbine housing 18, it does not expand as compared with a case in which they are made of the same material. Accordingly, it is possible to prevent the turbine housing 18 and partition wall 20 from being broken for a long period of time, because the difference in thermal expansion between the turbine housing 18 and the partition wall 20 and end member 21 is lowered and the generation of the thermal stress is reduced.

Next, a method for manufacturing the partition wall 20 and turbine housing 18 will be described.

A core N which corresponds to the interior contour of a turbine housing 18 is first formed as shown in FIG. 19. In the manufacture of the core N, an end member 21 formed precisely is embedded in the axial center of the core N, but the outer circumferential part of the end member 21 is left exposed a little. At that time, the core N and the end member 21 are bonded each other.

Then, a molten metal is poured into a mold with the core N set therein, thereby to cast the turbine housing 18. After cooling the mold, the core N is removed therefrom. At that time, the end member 21 is formed in such a state that its outer circumferential part exposed as abovementioned is embedded in the inner circumferential part of the partition wall 20 protrudedly formed on the turbine housing 18.

Thus, the end member 21 can be mounted so that its end is close to the outer peripheral edge of the turbine rotor 16.

In the way, the clearance $\delta$ between the outer peripheral edge of the turbine rotor 16 and the end of the end member 21 can be reduced to about 2 mm.

In an ordinary casting process, the quick enlargement of an exhaust gas passage has been inevitable, because it is impossible to form a turbine housing so that its partition wall has a given clearance below 3 mm. According to the aforementioned method, on the contrary, it is possible to avoid the quick enlargement of the exhaust gas passage and to prevent the loss of energy caused by that enlargement.

By forming the end member 21 so that it has a smooth shape of curve, the exhaust gas passage which leads from the exhaust gas passages A, B to the turbine rotor 16 can be formed as a passage which changes gently, thereby to eliminate a quick enlarged portion in the exhaust gas passage.

Although the end member 21 has been fitted on the turbine housing 18 through the casting process stated above, in the abovementioned embodiment, it is possible to carry out the fitting of the end member 21 also through another process such as welding or brazing.

Figure 20:
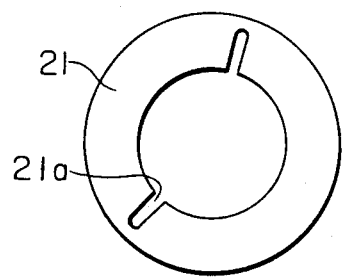
Figure 21:
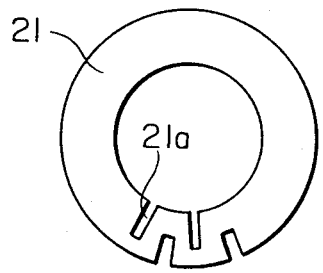
Figure 22:
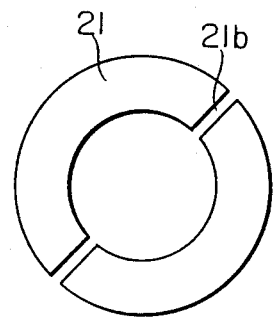

FIGS. 20 to 22 show different modifications of the annular member 21 in the fourth embodiment, in which its deformation owing to the thermal stress is prevented.

The inner circumferential part of the end member 21 undergoes thermal stress caused by exhaust gas, and it will be easily deformed or damaged by the thermal stress. In FIG. 20 and FIG. 21, there are provided as a countermeasure thereto one or more radial slits 21a on the inner circumferential part of the end member 21 or on both the inner and outer circumferential parts thereof, whereby the deformation of the end member to its circumferential direction caused by the thermal stress can be absorbed to prevent its breakage. In FIG. 22, furthermore, the end member 21 is made in a divided structure wherein raidal slits 21b are formed on the end member 21, after it is secured on the partition wall 20.

Figure 23:
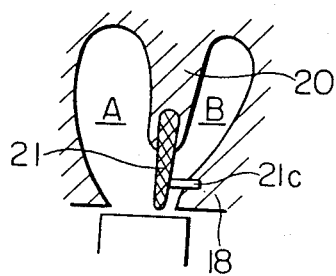
FIG. 23 is a partially enlarged vertical sectional view of the turbine housing showing a modification of the fourth embodiment.

The modification of the aforementioned fourth embodiment, shown in FIG. 23, is devised to prevent the exhaust gas passage B from being contracted by the deformation of the end member 21 owing to thermal stress, with its end caused to come down to the side of the exhaust gas passage B. To this end, on the side wall of the turbine housing which demarcates the exhaust gas passage B, one or more pins 21c are fixed so as to face to and contact with the portion of the end member 21 which will be primarily thermally deformed.

Figure 24:
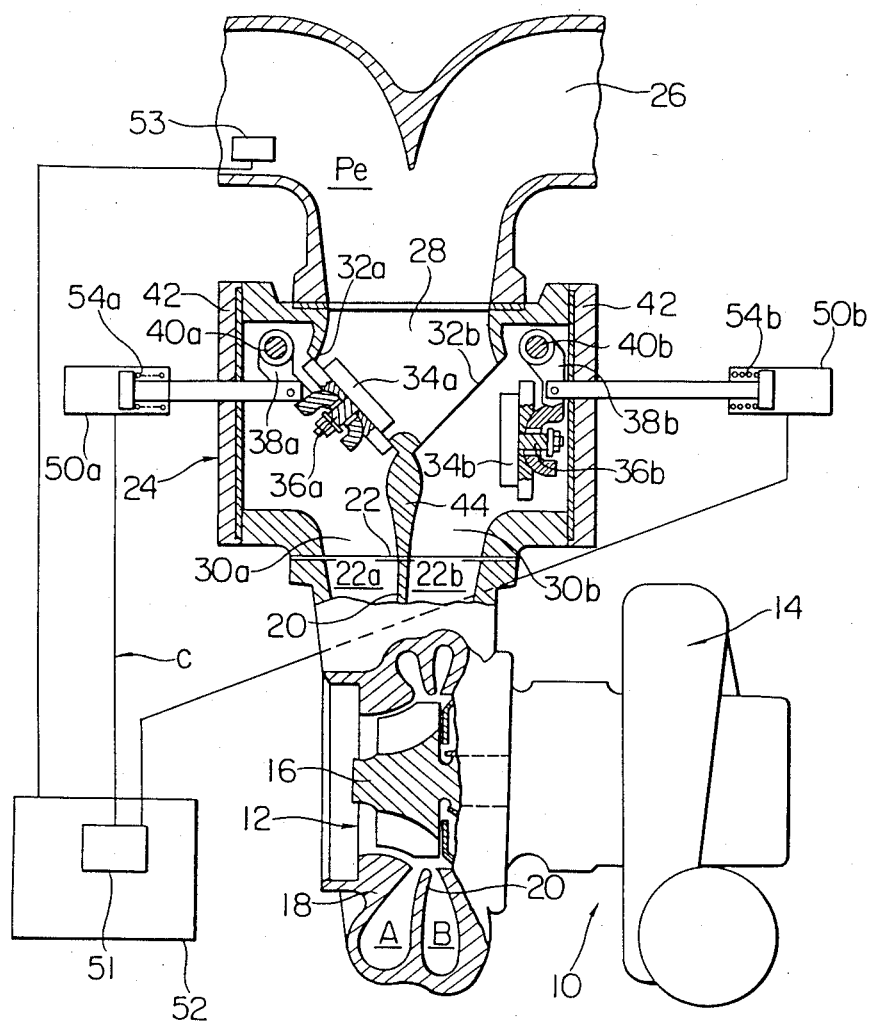
FIG. 24 is a vertical sectional view of a turbocharger device showing the fifth embodiment of the invention.
Figure 25:
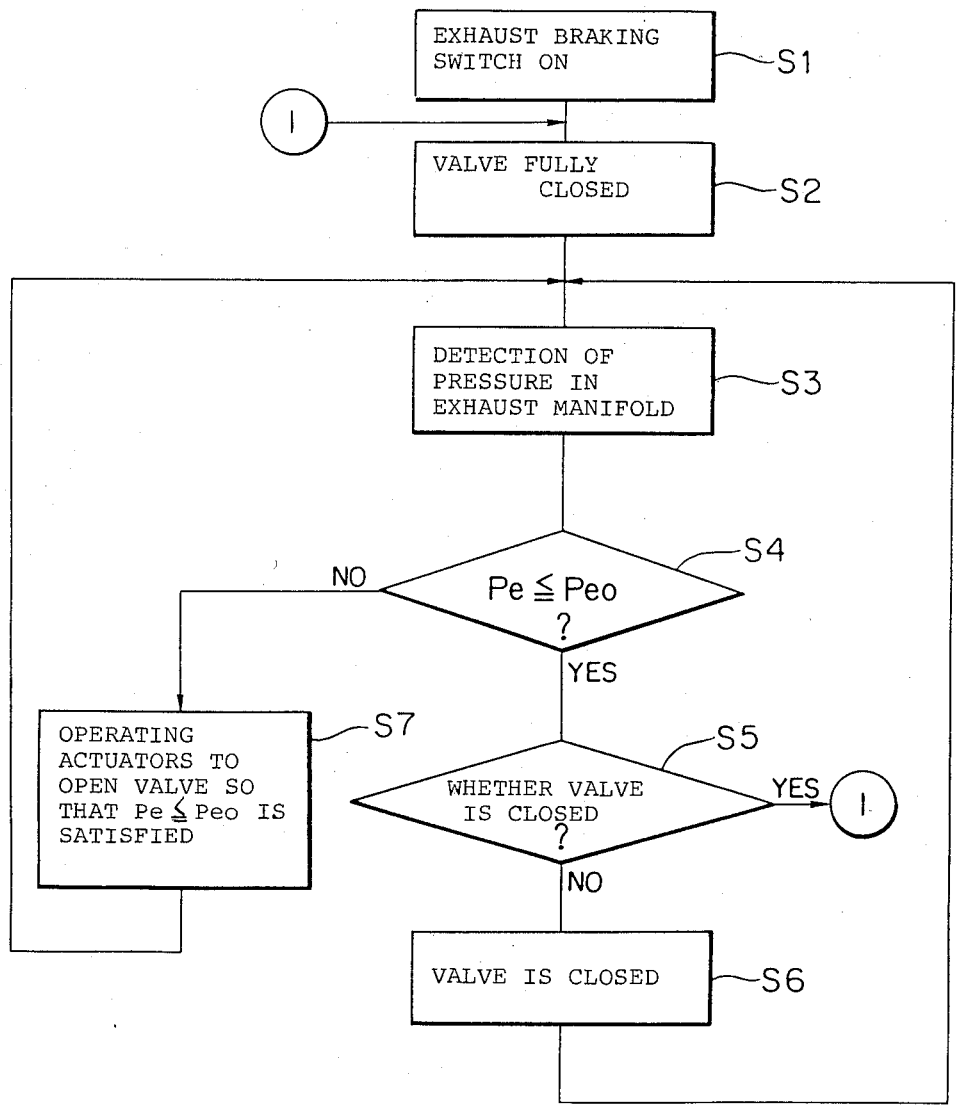
FIG. 25 is a flowchart showing the operation of the turbocharger device of FIG. 24.
Figure 26:
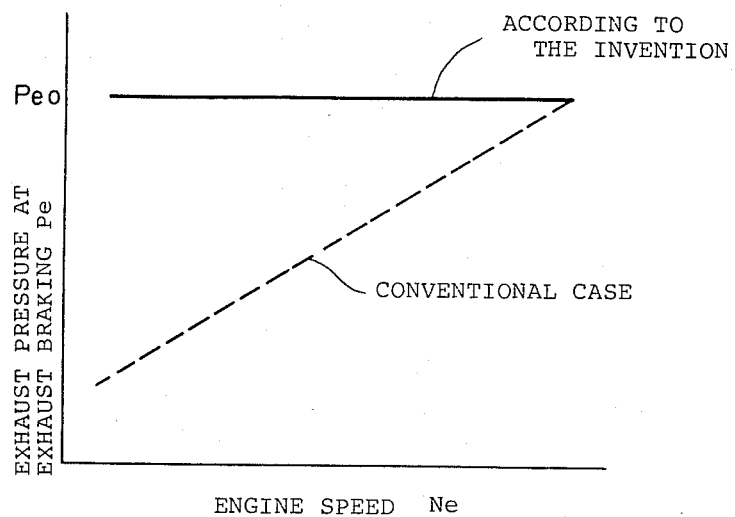
FIG. 26 is a diagram of the operational characteristic of the turbocharger device of FIG. 24.

In the fifth embodiment according to the present invention shown in FIGS. 24 to 26, an exhaust braking function which is exhibited throughout the whole area of an engine speed is added to the variable-volume turbocharger device of the first and second embodiment.

Since the turbocharger devices 10 shown in FIG. 1 and FIG. 10 are substantially different from each other only in the viewpoint of the arrangement of the valve means, the exhaust braking function will be described below in relation only to the turbocharger device of FIG. 1. But, the description in the matter of the exhaust braking function may be also applied to the turbocharger device of FIG. 10. In addition, the description will be made only about the exhaust braking function, because the structure of the turbocharger device 10 in this embodiment itself is entirely the same as one shown in FIG. 1.

In FIG. 24, a valve control mechanism, diagrammatically indicated at C, is provided on the rocker arms 38a, 38b of the valve means. This valve control mechanism C is composed of actuators 50a, 50b, a hydraulic pressure source 51 for feeding a working pressure to both the actuators, and a controller 52 connected to an exhaust pressure sensor 53 provided in the exhaust manifold 26 so as to carry out the feedback control of the valve control mechanism C.

The controller 52 is so composed as to effect the operations in the flowchart shown in FIG. 25.

On the basis of the opening and shutting signals for the valve means which are output from the so-composed controller 52, the actuators 50a, 50b are actuated to drive the rocker arms 38a, 38b and the valve members 34a, 34b are operated to open or close, whereby the inside of the exhaust manifold 26 at the upstream side of the valve members 34a, 34b is kept at the maximum pressure which is below a predetermined pressure Peo.

When the engine is caused to effect the exhaust braking, an exhaust braking switch (not shown) is turned on, as shown at the step S1 of FIG. 25.

The step S2 is, thereby, carried out in the controller 52 and the actuators 50a, 50b are driven so that the valve members 34a, 34b are completely closed.

Next, the step S3 is carried out wherein the exhaust pressure Pe in the exhaust manifold 26 is detected by the exhaust pressure sensor 53 and transmitted to the controller 52.

In the controller 52, the step S4 is carried out, wherein it is judged whether the exhaust pressure Pe is lower than the pressure Peo previously set in the controller 52. When "YES", the step S5 will be then carried out.

At the step S5, it is judged whether the valve members 34a, 34b are closed or not. In the case "YES", that closed state of them is maintained as it stands.

But, when it is "No", the actuators 50a, 50b are actuated to shut the valve members 34a, 34b, and the steps S3 to S6 are thereafter repeated.

On the other hand, when it has been judged that the exhaust pressure Pe in the exhaust manifold 26 is larger than the pressure Peo at the step S4, the normal route is not applied and the step S7 is carried out, wherein either of the actuators 50a (or 50b) is actuated, thereby to open the corresponding valve member 34a (or 34b).

Thus, the step S4, step S7 and step S3 are repeated until the exhaust pressure Pe becomes below the pressure Peo, and the opening of the valve member 34a is controlled so that the exhaust pressure Pe is below the pressure Peo.

Through these operations, there will be obtained such an exhaust braking effect as mentioned below.

In a case that an engine is operated in a low speed area, the exhaust pressure Pe does not reach a pressure over said predetermined pressure which has bad influences upon a valve actuating system, and either valve member 34a (or 34b) is not actuated to open against the air pressure in the actuator 50a (or 50b). Thus, the exhaust pressure Pe is completely sealed and the braking effect which is caused by the maximum exhaust pressure Pe at that engine speed can be obtained.

Furthermore, in the case that the engine is operated in a medium or high speed area, the valve member 34a is actuated to open against the air pressure in the actuator 50a, on the basis of the indication signals of the controller 52, when the exhaust gas Pe becomes over the pressure Peo in the result of the shutting of the valve members 34a, 34b. Through the feedback control which leads from the step S3 to the step S7, the valve member 34a is then opened at a position where the pressing force caused by the actuator 50a and the exhaust pressure Pe are balanced, thereby to keep the exhaust pressure Pe in the exhaust manifold 26 at the pressure Peo.

In a conventional technique, as shown by the dotted line in FIG. 26, an exhaust pressure Pe which can obtain the exhaust braking effect changes with an engine speed, and an exhaust braking valve has a small hole perforated therein so as to obtain a predetermined pressure Peo when the engine speed is high. Thus, it has such a characteristic that the exhaust pressure Peo is remarkably lowered when the engine speed is low.

According to the device of this embodiment, however, the valve members 34a, 34b are kept closed when the exhaust pressure Pe in the exhaust manifold 26 is lower than the predetermined pressure Peo, and the openings of these valve members are automatically controlled by way of the controller 52 so that the exhaust pressure Pe is made to be the predetermined pressure Peo when the exhaust pressure Pe has become over the pressure Peo. In spite of the engine speed, therefore, the maximum exhaust pressure Pe at that engine speed, with a limitation of the predetermined pressure Peo, acts as the exhaust pressure Pe for the exhaust braking.

Thus, the device according to this invention can obtain a satisfactory exhaust braking effect throughout the whole area of engine speed.

Assuming that the air pressure in the actuator 50a (or 50b) is Pa, the pressure-receiving area of the actuator 50a is Aa, the force of the return spring 54a (or 54b) of the actuator is Fs and the pressure-receiving area of the valve member 34a (or 34b) is Av, the force which acts upon the valve member 34a (or 34b) will be represented by the formula (PaAa—Fs). These factors Pa, Aa and Fs are set so as to satisfy the following expression;

$$P_aA_a - F_s = A_vP_{eo}.$$

Namely, when the exhaust pressure Pe is over the predetermined pressure Peo (Pe>Peo), the following inequality will be satisfied;

$$P_aA_a - F_s = A_vP_{eo} < A_vP_e.$$

And just then, the valve member 34a (34b) is forced to open and its opening is automatically controlled so as to satisfy the following expressions;

$$P_aA_a - F_s = A_vP_{eo} = A_vP_e.$$

Thus, the supercharge of air with good efficiency can be carried out and at the same time, the exhaust braking effect can be obtained with accuracy, by means of the turbocharger device 10.

The use of the abovementioned exhaust braking device makes a conventional exhaust brake useless and the reduction of cost realizable.

Figure 6:
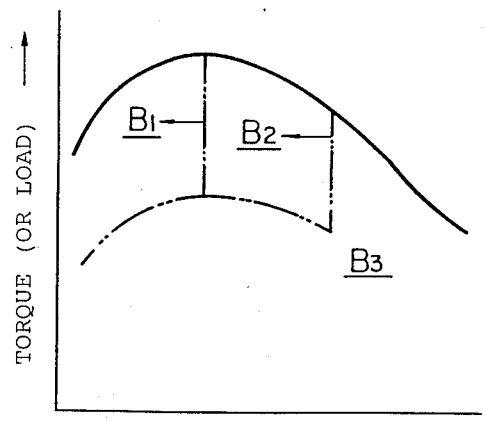
FIG. 6 is a diagram of the operational characteristic of the turbocharger device.

The opening and shutting operation of the valve means in the variable-volume turbocharger devcie which has been described with reference to FIG. 1, FIG. 5 and FIG. 6, is devised to be controlled upon the engine speed and load. When an accelerator pedal is released, such as a gear shifting is operated during travelling, according to this control method, the exhaust gas turbine 12 will be therefore operated, owing to the reduction in engine speed and load caused at that time, in the region $B_3$ of FIG. 6, this is under such a state that the flow passage area of its exhaust gas passage is the maximum (with the flow characteristic $B_3$ shown in FIG. 5) and in other words, the boost pressure of the compressor 14 is lower. As a result, a period of time until the engine speed which matches for a given torque is achieved by depressing the accelerator pedal again becomes larger. As a result, the rising of the exhaust gas turbine until the given torque is achieved after the gear shifting operation is late and the responsibility of the engine to the depression of the accelerator pedal is bad.

The first control method for improving the transient responsibility of the engine at the re-depression of the accelerator pedal will be described with reference to FIGS. 27 to 30.

Figure 27:
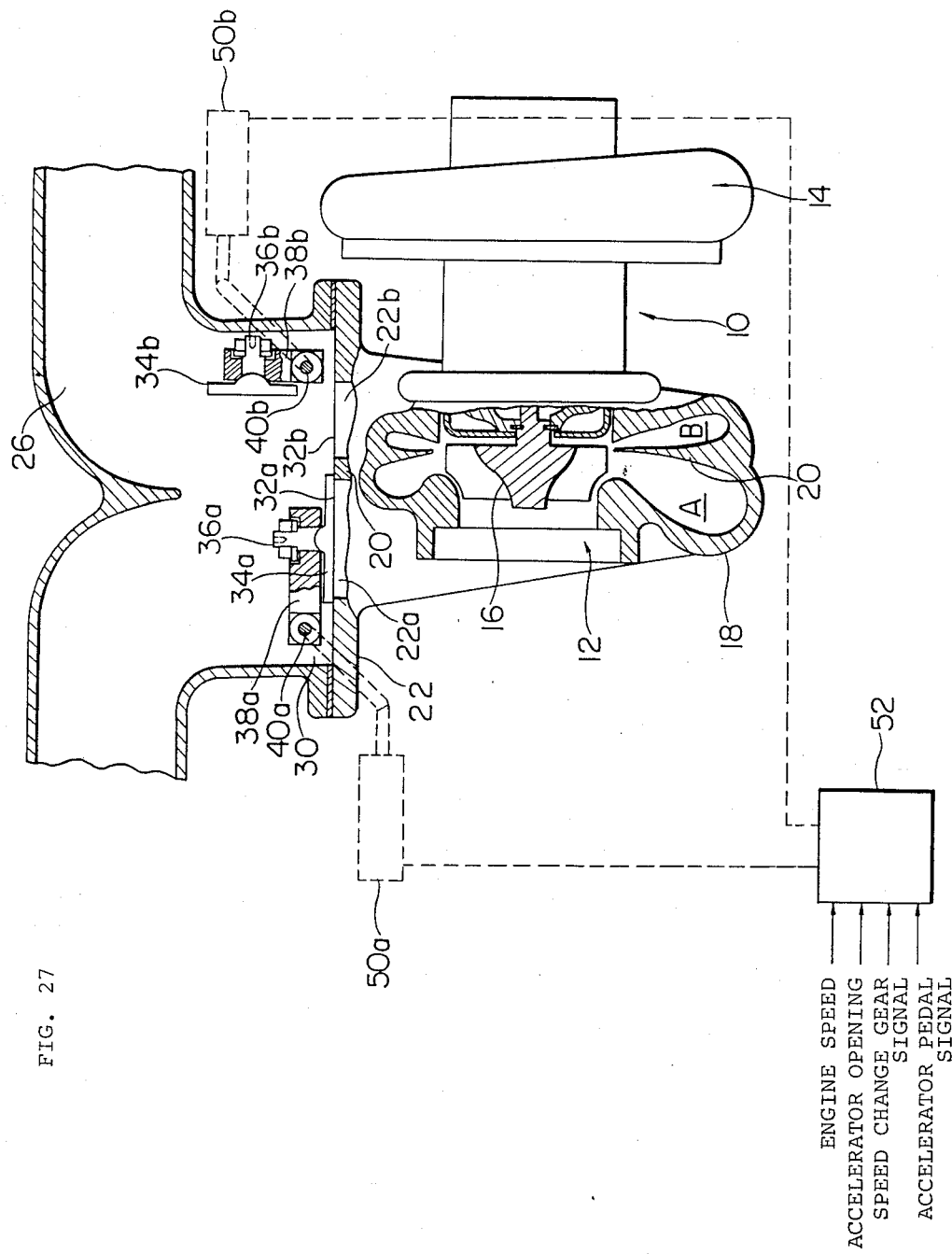
FIG. 27 is a vertical sectional view of the turbocharger device for illustrating a different control method.
Figure 29:
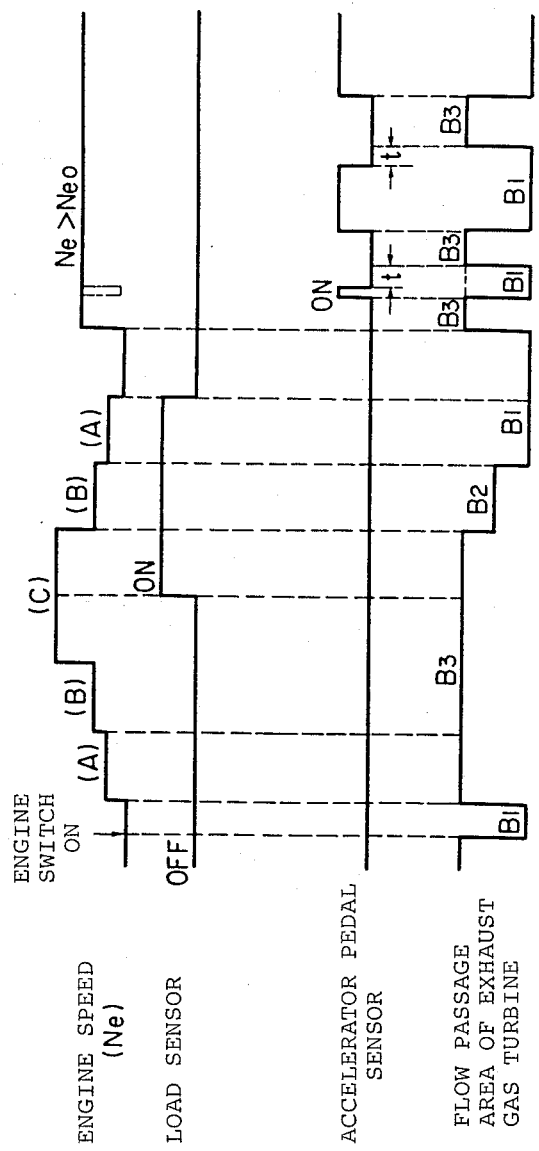

The structure of a variable-volume turbocharger device 10 shown in FIG. 27 is that actuators 50a, 50b and a controller 52 similar to these of the aforementioned fifth embodiment are incorporated in the turbocharger device of the aforementioned second embodiment. In addition, the structure of the turbocharger device itself is the same as that of the first embodiment.

In this first control method, it is devised that the opening and shutting operation of the valve means is controlled in accordance with the state of depression (on-off) of the accelerator pedal as well as the state of the engine speed and load (the accelerator opening). This state of depression of the accelerator pedal is detected by means of an accelerator pedal sensor such as a known microswitch. Regardless of the load, in the case that the engine speed is lower than a low rotation speed Neo previously set and the accelerator pedal has been depressed, or when the accelerator pedal is released in the case that the engine speed is over Neo and the engine is in a low load operation, as illustrated in the operation characteristic diagram of FIG. 28 and in the operational mode diagrams of FIGS. 29 and 30, the actuators 50a, 50b are controlled by means of the controller 52, whereby only the valve member 34b for the exhaust gas passage B with a small flow passage area is opened and the exhaust gas turbine 12 is operated with its flow passage area set at the minimum (this is, with the flow characteristic $B_1$ shown in FIG. 5). As can be seen from FIG. 29, in addition, it may be carried out to maintain the flow passage area at the minimum only for a given period of time t, after the accelerator pedal is depressed again after its release.

Figure 28:
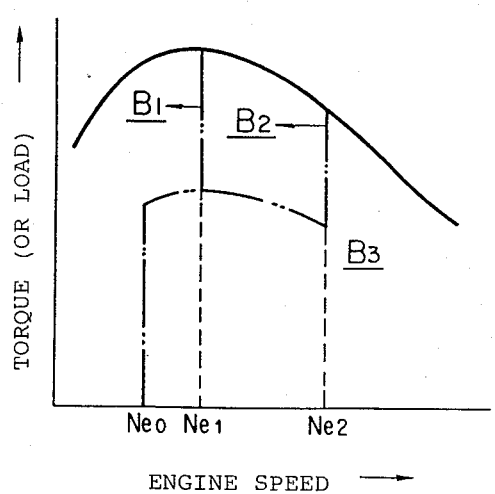
FIG. 28 is a diagram of the operational characteristic of the turbocharger device in accordance with the first control method, FIG. 29 and FIG. 30 each are diagram showing the operational mode in accordance with said first control method.

By such a setting, the region $B_1$ is expanded widely as shown in FIG. 28, in comparison with FIG. 6, and as a result, the transient responsibility of the engine at the re-depression of the accelerator pedal is improved.

In the operation control method of the aforementioned first embodiment, the exhaust gas turbine 12 is operated under such a state that the flow passage area of its exhaust gas passage is the maximum (with the flow characteristic $B_3$ in FIG. 5), and in other words, the boost pressure of the compressor 14 is low, even when the engine is in a low load operation. Therefore, the speed up of the exhaust gas turbine 12 at the time when the engine load is increased by depressing the accelerator and the response of the engine is bad.

Next, the second control method for improving the transient responsiblity of an engine at the increase of its load will be described here with reference to FIG. 31.

In this second contrcl method, the exhaust gas turbine 12 is controlled in response to the state of the engine speed and load, but the engine load is detected from the accelerator opening α of the accelerator pedal by use of a known sensor. When the engine is in a low load operation in which the accelerator opening α is small than the first set value $α_1$ and an engine load is small, as shown in FIG. 31, the exhaust gas turbine 12 is operated with its flow passage area set at the minimum (this is, with the flow characteristic $B_1$ shown FIG. 5), regardless of the engine speed, by means of the controller 52. In a case that the accelerator opening α is larger than the first set value $α_1$ or the second set value $α_2$, the flow passage area of the exhaust gas turbine 12, this is its flow characteristic, is controlled in response to the load state and engine speed, simillarly to the first embodiment.

Figures 30, 31:
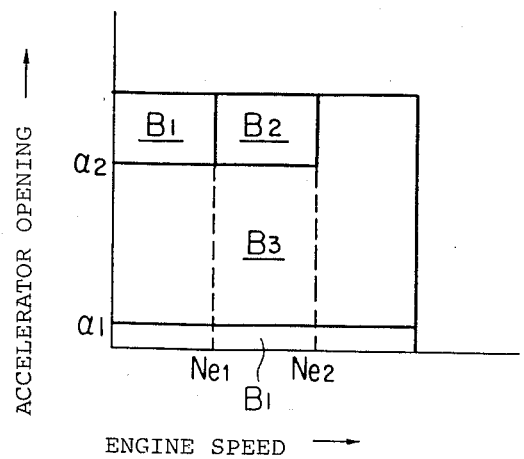
FIG. 31 is a diagram of the operational characteristic of the turbocharger device in accordance with the second control method.

By such a setting, the region $B_1$ shown in FIG. 31 can be obtained when the accelerator opening is small and the engine load is also small, and as a result, the transient responsibility of the engine at the depression of the accelerator pedal or at the time when the engine load is increased, is improved.

When driving a truck, bus or the like, a driver often conducts a gear shift-down operation, with operating a double clutching. In this case, this gear shift-down operation is normally carried out after an accelerator pedal is depressed at the neutral position among the speed change gears of a transmission to increase the engine speed. If the method of the aforementioned first embodiment in which the exhaust gas turbine 12 is controlled only upon the engine speed and load state is applied at that time, the exhaust gas passage A with a larger flow passage area will be opened and the speed of the turbine rotor 16 will be lowered when the accelerator pedal is depressed to increase the engine speed. The responsibility of the engine at the time when the accelerator pedal is depressed again is therefore bad.

The third control method for improving the transient responsibility of an engine at the gear shift-down operation will be practiced as follows. As shown in FIG. 27, the opening and shutting operation of the valve means is controlled in response to the engine speed and load state and further to the speed change gear signals from a known sensor for detecting whether the speed change gear of a transmission is in a neutral position. When the neutral position is detected from the speed change gear signal, the actuators 50a, 50b are controlled by the controller 52, regardless of the engine speed and load, and only the valve member 34b in the exhaust gas passage B with a smaller flow passage area is opened, whereby the exhaust gas turbine 12 is operated with its flow passage area set at the minimum (this is, with the flow characteristic $B_1$ shown in FIG. 5). In the result, the turbine rotor 16 is maintained as it is rotated at a high speed and the transient responsibility of the engine at the next depression of the accelerator pedal is improved.

What is claimed:

1. A variable-volume turbocharger device comprising a turbine housing having at least first and second exhaust gas passages divided by a partition wall provided in the housing, said first exhaust gas passage having a large flow characteristic and said second exhaust gas pasage having a small flow characteristic, a first valve means operable to open and shut said first exhaust gas passage, and a second valve means operative to open and shut said second exhaust gas passage independently from said first valve means, each of said valve means having a valve member which cooperates with a valve seat to open and shut the corresponding exhaust gas passage, said valve members being arranged so as to open toward the upstream side of the flowing direction of exhaust gas with respect to said valve seats.

2. A variable-volume turbocharger device, as set forth in claim 1, which further comprises a valve control mechanism responsive to the operating conditions of an engine associated with said turbocharger to open either one or both of said first and second valve means so as to provide three different turbine characteristics of large, medium and small flow rates.

3. A variable-volume turbocharger device, as set forth in claim 1, in which said turbine housing has inlets each leading to said exhaust gas passages, a valve casing with said valve seats provided thereon is interposed between said inlets and an exhaust device of an engine, and said valve members each are movably supported on rocker arms pivotally supported on said valve casing, with a clearance existing between them.

4. A variable-volume turbocharger device, as set forth in claim 1, in which said turbine housing has inlets each leading to said exhaust gas passages, said valve seats are provided on said inlets, and said valve members each are movably supported on rocker arms pivotally supported on said turbine housing, with a clearance existing between them.

5. A variable-volume turbocharger device, as set forth in claim 1, in which said valve members each are movably supported on rocker arms arranged for pivotal movement, with a clearance existing between them, and a supporting point of each of said valve members to the rocker arm is offset toward the center of the pivotal movement of said rocker arm, with respect to the working center point of an exhaust gas pressure acting upon the valve member.

6. A variable-volume turbocharger device, as set forth in claim 1, in which it further comprises a valve control mechanism which keeps the closed state of said valve means when an exhaust pressure at the upstream side of the valve means is below a predetermined pressure and causes either one of said valve means to open when the exhaust pressure is increased over the predetermined pressure, during the braking operation, an exhaust pressure sensor for detecting the exhaust pressure at the upstream side of said valve means, and a controller for outputting the opening and shutting signals for said valve means to said valve control mechanism on the basis of the detection signals of said exhaust pressure sensor.

7. A variable-volume turbocharger device, as set forth in claim 1, in whcih said valve means are actuated to open or shut by actuators, respectively, and said actuators are linked to each other so as to assist a working force for shutting one of said valve means.

8. A variable-volume turbocharger device, as set forth in claim 1, in which said valve means are actuated to open or shut by actuators, respectively, and said actuators are linked to each other so as to assist a working force for opening one of said valve means.

9. A variable-volume turbocharger device, as set forth in claim 1, in which said turbine housing has inlets each leading to said exhaust gas passages, the valve seats are provided on said inlets, and said valve members each are movably supported on rocker arms pivotally supported on an exhaust manifold of an engine, with a clearance existing between the.

10. A variable-volume turbocharger device, as set forth in claim 9, in which each of said valve members is made in the shape of a rectangle and prevented from its turning to the corresponding rocker arm by means of a turn preventing means.

11. A variable-volume turbocharger device, as set forth in claim 9, in which each of said rocker arms is secured on a support shaft pivotally supported by way of a fixed bush, and said bush is made of martensitic chromium carbide-precipitated steel and said support shaft is made of martensitic steel.

12. A variable-volume turbocharger device, as set forth in claim 9, in which each of said rocker arms is secured on a support shaft pivotally supported by way of a fixed bush, and said bush is made of ceramic and said support shaft is made of martensitic chromium carbide-precipitated steel.

* * * * *